United States Patent
Hodge et al.

(10) Patent No.: US 8,843,346 B2
(45) Date of Patent: Sep. 23, 2014

(54) USING SPATIAL INFORMATION WITH DEVICE INTERACTION

(75) Inventors: Dennis Hodge, Bellevue, WA (US); Allen Ming-kuang Han, Snoqualmie, WA (US)

(73) Assignee: Amazon Technologies, Inc., Reno, NV (US)

(*) Notice: Subject to any disclaimer, the term of this patent is extended or adjusted under 35 U.S.C. 154(b) by 267 days.

(21) Appl. No.: 13/107,692

(22) Filed: May 13, 2011

(65) Prior Publication Data

US 2012/0290257 A1    Nov. 15, 2012

(51) Int. Cl.
G06F 15/00 (2006.01)
G01C 1/00 (2006.01)
G06F 1/32 (2006.01)
G06F 3/01 (2006.01)
G06F 1/16 (2006.01)

(52) U.S. Cl.
CPC ............ *G06F 1/3206* (2013.01); *G06F 3/011* (2013.01); *G06F 1/1626* (2013.01); *G06F 1/1694* (2013.01)
USPC ............................ 702/151; 715/863; 348/135

(58) Field of Classification Search
CPC .................................. G06F 15/00; G01C 1/00
USPC ............ 702/151, 150, 94, 156; 715/683, 863; 348/135
See application file for complete search history.

(56) References Cited

U.S. PATENT DOCUMENTS

| | | | |
|---|---|---|---|
| 6,204,828 B1 | 3/2001 | Amir et al. | |
| 6,208,373 B1 * | 3/2001 | Fong et al. | ............... 348/14.16 |
| 6,577,329 B1 | 6/2003 | Flickner et al. | |
| 6,920,376 B2 | 7/2005 | Jouppi et al. | |
| 7,181,251 B2 | 2/2007 | Stohr et al. | |
| 7,280,096 B2 | 10/2007 | Marvit et al. | |
| 7,536,029 B2 | 5/2009 | Choi et al. | |
| 7,602,942 B2 | 10/2009 | Bazakos et al. | |
| 8,005,272 B2 | 8/2011 | Grim, III et al. | |
| 8,194,926 B1 | 6/2012 | Keysers et al. | |
| 2006/0265442 A1 | 11/2006 | Palayur | |
| 2007/0097065 A1 | 5/2007 | Kreek et al. | |

(Continued)

OTHER PUBLICATIONS

Klein, et al., "Parallel tracking and mapping on a camera phone", 2009 IEEE.*

(Continued)

*Primary Examiner* — John Breene
*Assistant Examiner* — Ruihua Zhang
(74) *Attorney, Agent, or Firm* — Novak Druce Connolly Bove + Quigg LLP (57) ABSTRACT

The amount of resources needed for an electronic device to track and/or interact with a user is reduced by utilizing a predicted relative position of that user. In some embodiments, a full 360° scan is performed using at least one image capture element to locate a primary direction to a user of the device. Once this direction is determined, a smaller range (e.g., 45°) centered around that direction can be used to capture, analyze, or provide information for the user. As the user moves, the determined direction is updated and the range adjusted accordingly. If the user moves outside the range, the device can increase the size of the range until the user is located, and the range can again be decreased around the determined direction. Such approaches limit the amount of image or audio information that must be captured and/or analyzed to track the relative position of a user.

28 Claims, 7 Drawing Sheets

(56) References Cited

U.S. PATENT DOCUMENTS

| | | |
|---|---|---|
| 2007/0121020 A1 | 5/2007 | Ichimura |
| 2008/0193009 A1* | 8/2008 | Sonoura ........................ 382/153 |
| 2009/0054077 A1* | 2/2009 | Gauthier et al. ........... 455/456.1 |
| 2009/0138805 A1 | 5/2009 | Hildreth |
| 2009/0251530 A1 | 10/2009 | Cilia |
| 2009/0315740 A1* | 12/2009 | Hildreth et al. ................. 341/20 |
| 2010/0079508 A1 | 4/2010 | Hodge et al. |
| 2010/0125816 A1* | 5/2010 | Bezos ........................... 715/863 |
| 2010/0225743 A1* | 9/2010 | Florencio et al. ............... 348/46 |
| 2011/0205148 A1 | 8/2011 | Corriveau et al. |
| 2012/0062729 A1* | 3/2012 | Hart et al. ...................... 348/135 |
| 2012/0086729 A1* | 4/2012 | Baseley et al. ................. 345/633 |
| 2012/0259638 A1* | 10/2012 | Kalinli .......................... 704/270 |
| 2012/0324213 A1* | 12/2012 | Ho et al. ........................ 713/100 |

OTHER PUBLICATIONS

Carbini, et al., "Tracking body parts of multiple people for multi-person multimodal interface", ICCV 2005.*

"PCT Search Report," dated Aug. 7, 2012, International Application No. PCT/US2012/037220, Aug. 7, 2012, 2 pages.

* cited by examiner

FIG. 8

USING SPATIAL INFORMATION WITH DEVICE INTERACTION

BACKGROUND

People are increasingly relying upon electronic devices for a variety of different tasks. Accordingly, there is an increasing number of ways in which a user can interact with a device to perform these tasks. In some cases, an electronic device might record audio or video information corresponding to a user of the device, and might perform processes such as image recognition or voice analysis. In many of these cases, a device would have to capture and analyze information corresponding to a large area or region around the device. If the device is interested in information from only a portion of this area, the device can waste significant resources capturing and/or analyzing information over the entire area. Such waste can be particularly problematic for portable devices that run on battery power, as the extra resource usage can unnecessarily drain the battery and/or slow functionality of the device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing functionality in an electronic environment. In particular, devices can reduce the amount of information that must be captured and/or processed in various situations by tracking a relative position of a user, person, or other object of interest. By determining a primary direction to a user based on the relative position, for example, a device can limit a range of interest to a range of angles or other area or region around that primary direction. The primary direction and range of interest can be updated in response to movement of the user and/or the device. The ability to reduce the amount of information to be captured and/or processed can reduce the amount of resources needed, as well as the amount of power needed for such tasks. Further, the ability to focus on a region of interest can help to reject superfluous or unrelated data, for example, which can further increase accuracy and/or reduce the likelihood of false positives or other unintended results.

In one embodiment, one or more image capture elements can perform a 360° scan, or can capture image information in substantially all directions around the device, such as to locate at least one user or other object of interest. Once the user is located, the device can utilize a smaller range of angles to track the relative position of the user. For example, depending on aspects such as the sample rate, the device can capture image information over a range such as 45°, as may require only a single image capture element, or can analyze a portion of a large region, such as 45° of the full captured information. Similar approaches can be used to capture audio or biometric information, for example, as well as to project information such as audio or image data.

In some embodiments, a device can store recent movement information (e.g., changes in position or orientation) to a buffer. At an appropriate time, such as after the end of a movement, the information in the buffer can be analyzed and compared to known paths or types of movements. The path can be used to determine the likely relative position of the user, such that a smaller angular range can be used to locate the user after the movement. Further, if a type of path is determined from the matching process, the device can activate or perform certain functionality, such as to activate touch input and screen display when the user takes a device out of a pocket and places that device on a horizontal surface.

Various other applications, processes and uses are presented below with respect to the various embodiments.

Figure 1:
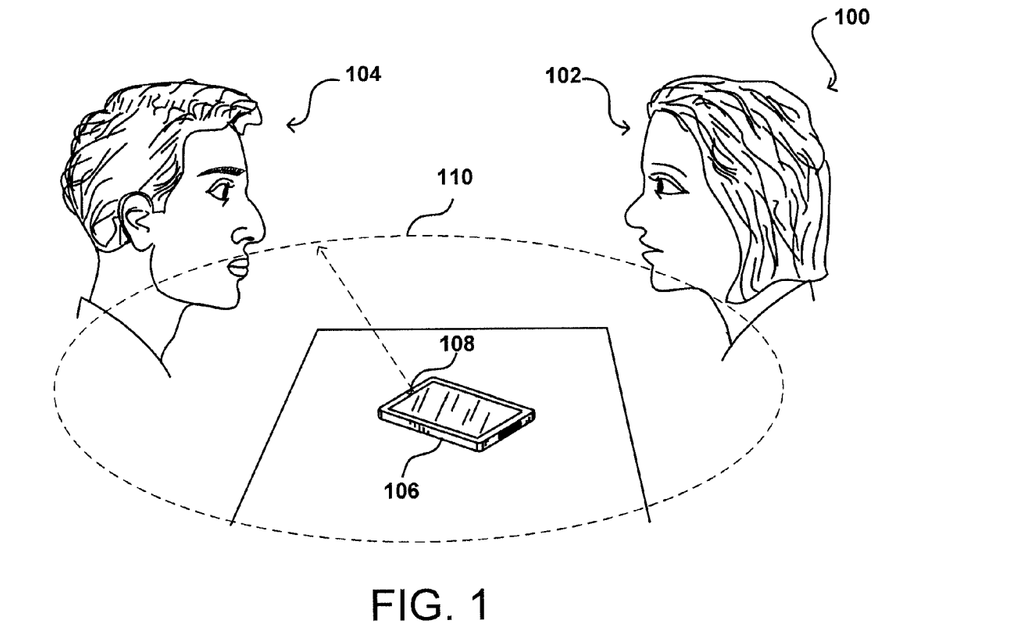
FIG. 1 illustrates an environment in which an electronic device is able to capture information in over a large range of directions around the device in accordance with various embodiments.

FIG. 1 illustrates an example situation 100 wherein two persons 102, 104 are positioned near an electronic device 106. The device 106 can perform any of a number of functions with respect to one or more of those persons, such as recording audio when one of the persons speaks, capturing video information of the currently speaking person, or performing location tracking for at least one of the persons with respect to the device. In the case where the device is attempting to track the relative location of a particular user, such as person 102 in this example, the device might utilize at least one camera 108 or other such imaging element to capture image information over a range of angles 110 around the device. In this example, the device captures information over a full 360° range around the device. The device might utilize a single camera with a wide angle or fisheye lens, a single rotatable camera element, multiple cameras, etc. Once image information is captured over the full angular range, the image information is analyzed to attempt to recognize the user 102, such as by performing facial recognition on the captured image information. As known in the art, performing facial recognition using large images can be very processor intensive, which can tie up resources on the device, reduce performance of the device, and place a large drain on the battery.

Figure 2:
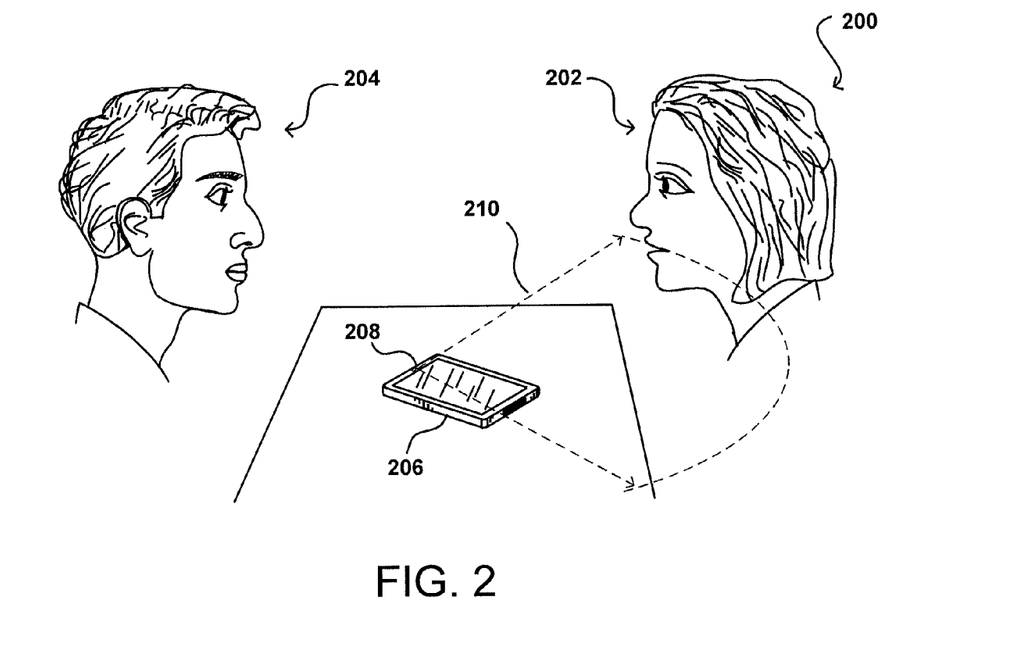
FIG. 2 illustrates an environment in which an electronic device is able to capture information over a smaller range of directions using spatial information known to the device in accordance with various embodiments.

FIG. 2 illustrates an example situation 200 wherein an electronic device 206 can utilize information known to, or determined by, the device to reduce the amount of processing needed to track the relative position of a user 202. In this example, the device can utilize one or more orientation, position, and/or movement determining elements to determine that the device has not moved significantly over a recent period of time, such as a number of seconds. The device 206 can also utilize the last known relative position of the user 202 to determine a likely range of positions of the user 202. For example, a device might have done an initial 360° scan using at least one imaging element 208 as discussed with respect to FIG. 1 above to determine that, out of persons 202 and 204 and any other objects located in the viewable range, the user 202 is located at a particular relative orientation with respect to the device 206. If the device has not moved, and the device tracks the position of the user with a sufficiently high frequency, such as at least once every one or two seconds, then the user is likely nearby the previously determined position.

Since the device assumes that the user likely only moves so fast with respect to the device in most cases, the device can reduce the amount of necessary processing by adjusting the image capture and/or processing based upon the likely relative position of the user 202. For example, if the user is in the same position or has not moved significantly from the previous location determination, the user likely is still within a given range of the last position from the perspective of the device. Thus, the device can reduce the angular range over which detection is likely needed. In this example, the angular range 210 is substantially less than 360°, such as 90° or 120°. Since the device has not moved, the user is likely somewhere within this range of the prior position (e.g., +/−60°) and the device can focus on capture and/or processing over that range.

The amount by which the range can be reduced can vary between embodiments and situations for any of a number of reasons. In this example, the detected face of the user 202 might take up about 5% of the angular range of image information. In some embodiments, the device might determine that, given the capture rate of the device, the user might move up to three times the detected angular width, such that a range of +/−15° might be sufficient. In other embodiments, fixed ranges such as +/−25° might be used. In embodiments where the capture rate varies as discussed elsewhere herein, the angular range can adjust accordingly.

In some embodiments, the capture rate and/or range can vary based upon detected movement of the user. For example, if the user has not moved for at least the last ten seconds, it might be assumed that the user is less likely to move between the current capture and the next capture, such that the capture frequency can be reduced and/or the angular capture range can be reduced. If the user is moving frequently, the capture frequency and/or angular range might be increased to improve the likelihood that the user will not likely be lost in the tracking process. It should be understood that in addition, or alternative, to the capture frequency changing, the capture frequency might stay the same but the frequency at which the captured information is analyzed can change based on these or other such factors.

In some embodiments, the device will start with as small a range as is practical, such as +/−15°. If the position of the user cannot accurately be determined, the device can gradually increase the range, such as to +/−25°, +/−50°, etc., until the position of the user can be determined. In at least some embodiments, if the position of the user is lost at least temporarily, the device can attempt another full range scan until the position of the user is determined, and then slowly reduce the angular range until the relative position of the user (with respect to the device) is relatively consistent or at least does not change more than the angular range between captures or analysis. Various other information and/or approaches can be used as well within the scope of the various embodiments.

Figure 3A:
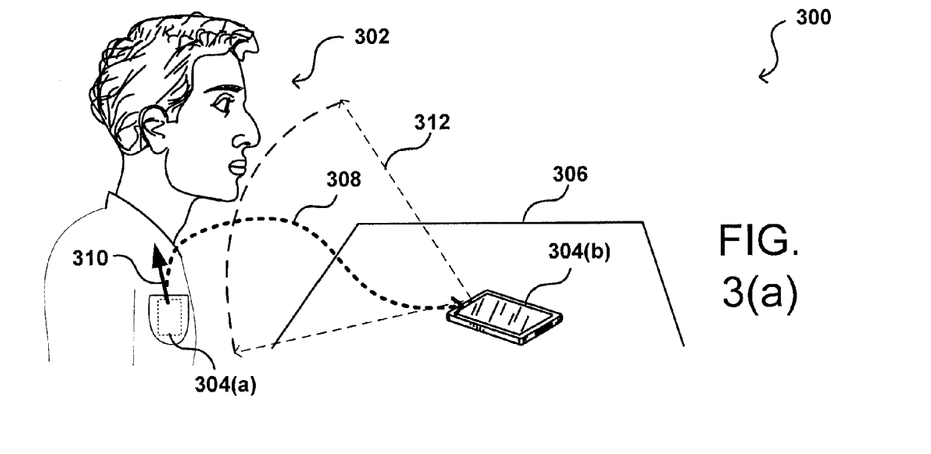
FIGS. 3(a)-3(c) illustrate example movements of an electronic device that can be used to adjust one or more aspects of the device in accordance with various embodiments.

In addition to tracking and predicting the likely relative position or direction of a user or other object with respect to the device based on movement of the user or object, a device can also predict the likely position or direction based at least in part upon movement of the device itself. For example, consider the situation 300 illustrated in FIG. 3(*a*). In this example, a user 302 initially has an electronic device 304 in his pocket. The device might be able to determine that it is in a location such as a pocket, based upon information such as orientation over a period of time and being in a place with very little light, as may be determined by a light sensor or other such element. When the user 302 wants to view the device, or otherwise have the device readily available, the user may take the device out of its location 304(*a*) in the user's pocket and move the device to a position 304(*b*) such as on a table 306 in front of the user. The device can use one or more elements such as an accelerometer and/or gyroscope to determine the path 308 that the device traveled from the pocket to the table. Based on the path, the device might be able to compare the path to a library or other group of path-like behavior to determine that the user likely took the device out of a pocket and placed the device on a surface. Even without such a matching process, however, the device can likely determine (based on the path of travel) where the user is with respect to the device when the device is placed on the table. For example, if the path is in the plane of the Figure, the user is probably in the direction of the end of the path in the plane of the Figure. In another approach, the device can determine its path of movement and determine that the user is likely at or near a spot at which the path began.

By knowing the position 304(*a*) at which the path started and the position 304(*b*) at which the path ended, the device can determine that the user is likely in the general direction of position 304(*a*) relative to current position 304(*b*). Depending on the situation, the device might also determine the likely direction 310 with respect to position 304(*a*), and might be able to more accurately determine the likely relative direction of the user with respect to the device. For example, the device might be in any of a number of different orientations in the user's pocket, and might need to determine the likely orientation based on the path of travel, etc. In a situation such as described with respect to FIG. 2 wherein the device is monitoring or providing information for the user 302, for example, the device can start with an angular range 312 around the direction of position 304(*a*).

Figure 3B:
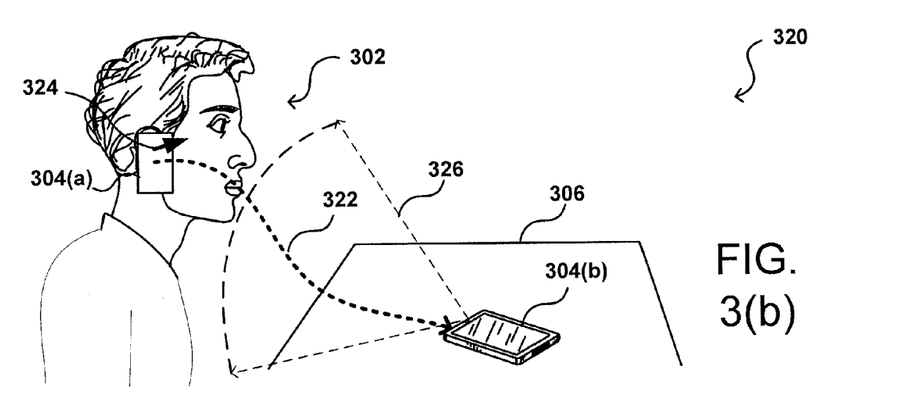

In some cases, the relative orientation of the user can be more clear. For example, in the situation 320 of FIG. 3(*b*), the user 302 is holding the device in a position 304(*a*) near the user's ear while the user is using the device as a phone. Based on the position of the speaker and microphone, as well as a state of a light sensor or other such element, the device can determine the relative direction 324 of the user while the user is talking into the device. When the user sets the device on the table 306 in position 304(*b*), the device can utilize the direction information and the knowledge about the path 322 traveled to determine the likely direction of the user 302, and can utilize an initial range of angles 326 that likely include the current position of the user.

Figure 3C:
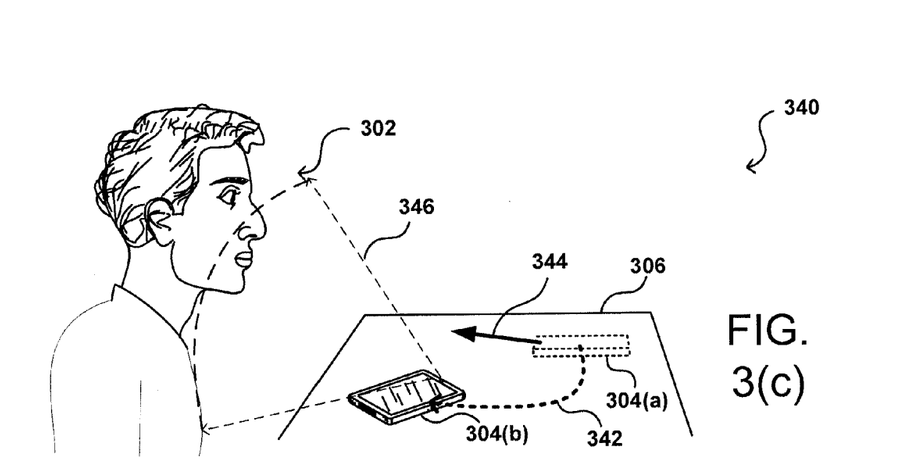

In some cases the movement of the device might be more simple. For example, in the situation 340 of FIG. 3(*c*), the device initially is in a first position 304(*a*) and orientation with the user 302 in a determined direction 344. The user might slide and rotate the device to a second position 304(*b*) along a path, such that the user can better view a display on the device, etc. By knowing the initial direction 344 and the path 342 of movement (including changes in orientation as well as position), the device in the second position 304(*b*) can determine the likely direction of the user and can utilize an appropriate range of angles 346 around that direction.

In some embodiments, the device can continually track and update position information, and can store information for the changes in position. In some embodiments, these movements can be determined and analyzed in real time. In other embodiments, an electronic device might include a buffer or other such cache or queue that stores position and/or orientation for a recent period of time, such as for the last ten seconds. If the device is in a mode or state that can benefit from information regarding changes in position or orientation, the device can pull the information from the buffer and analyze changes over that period. A ten second buffer might be sufficient to determine the paths in each of FIGS. 3(a)-3(c), such that the device can determine the likely direction of the user. Even in cases where the device did not previously know the direction to the user, path information such as that illustrated above can be used to determine a likely direction so as to be able to reduce the amount of processing needed with respect to the user (or other object, etc.)

Figure 4A:
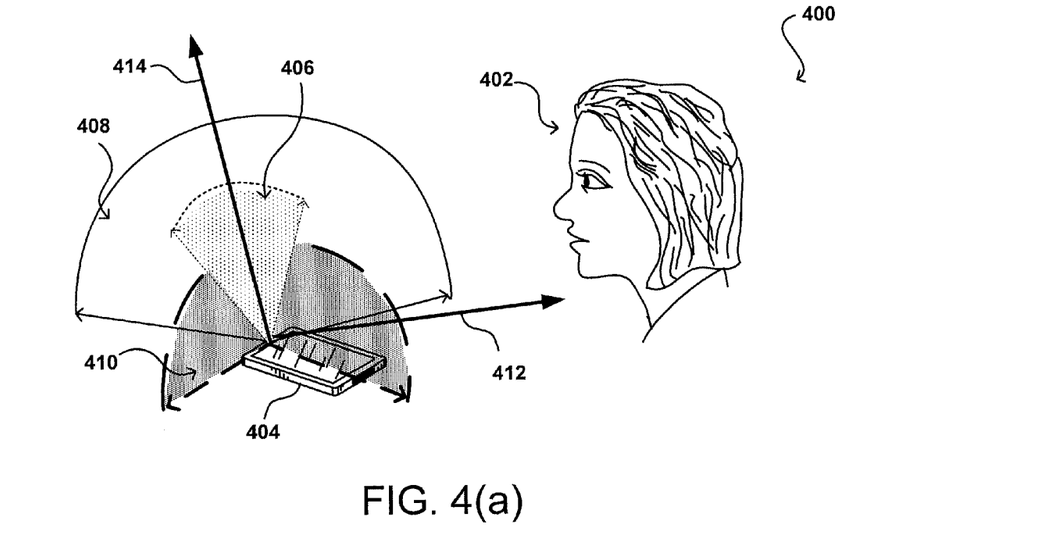
FIGS. 4(a)-4(e) illustrate example angular ranges that can be utilized in accordance with various embodiments.

As mentioned, however, sometimes the predicted direction to the user or object being tracked is not accurate. For example, as shown in example 400 in FIG. 4(a), an electronic device 404 determines that, based on a path of movement, the user is likely in a determined direction 414, while the user is actually in a different direction 412. This might happen when, for example, the user takes a phone out of a jacket hanging on a chair instead of a pocket of a garment the user is wearing. As illustrated, the device might utilize a first range of angles 406 around the determined direction 414 in order to attempt to locate the user. When the user is not located, the device tries a second, wider range of angles 408 about the determined direction 414. Although the ranges look to be of different lengths, it should be understood that this is merely to clearly show the different ranges in the Figure, and that the primary difference is in the range of angular spread. When the user 402 is not located sufficiently in the second angular range, the device can move to a third, still wider angular range 410 that in this example will include the user. Once the actual direction 412 is determined, a new angular range can be utilized that is based on the actual direction. The device can continue expanding the range in some embodiments until a full scan is performed, or a full angular range is captured and/or analyzed.

Figure 4B:
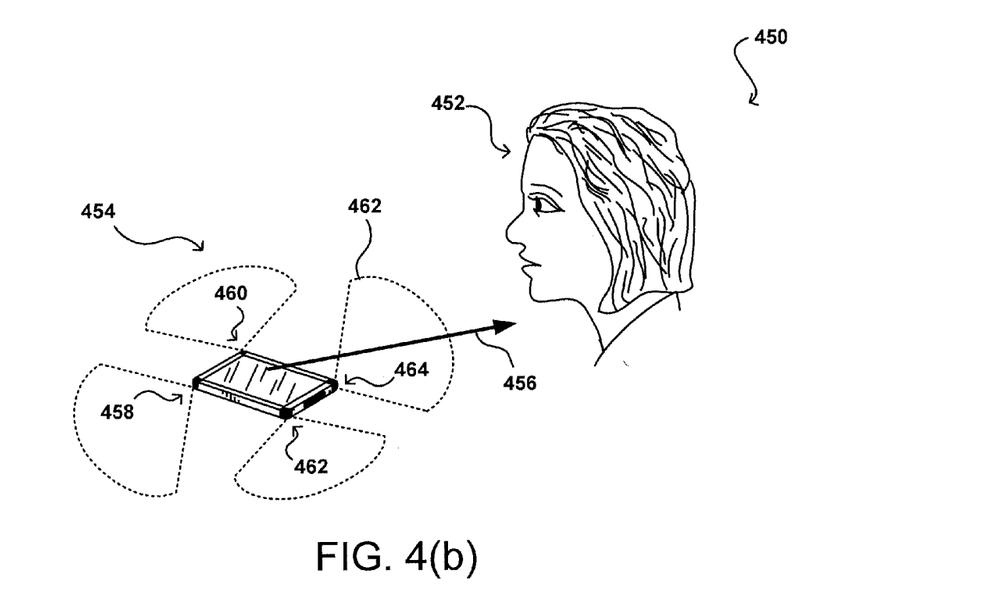

As mentioned, a device might scan over the determined range in some embodiments to capture image information over that range. In other embodiments, a device might capture information over a large range but only analyze information over the smaller determined range. In cases where the device has multiple capture elements, however, the device might instead selectively activate one or more elements to capture information in the determined direction. For example, consider the situation 450 of FIG. 4(b). In this example, the device has four capture elements 458, 460, 462, 464 (e.g., for audio and/or video) on the corners of the device 454. Once the direction 456 to the user 452 is determined, the device can compare a range around the relative direction to the user with the current orientation of the device to determine one or more capture elements to activate. For example, in FIG. 4(b) one capture element 464 is pointing in a direction toward the user 452 such that the effective angular view 462 might include the predicted range of directions to the user. If the view of the capture element 464 is not sufficient, the device might select at least one other capture element (e.g., element 462) to also capture information such that the likelihood of capturing usable information about the user is increased. In some embodiments, images or sounds from the various capture elements can be combined to improve recognition. If the user is not located, the number of activated capture elements can increase, up to the full number of capture elements on the device. By selectively activating one or more elements based on a determined direction of a user or other object being tracked or otherwise located, the device can conserve resources based at least in part upon having fewer currently active elements.

Figure 4C:
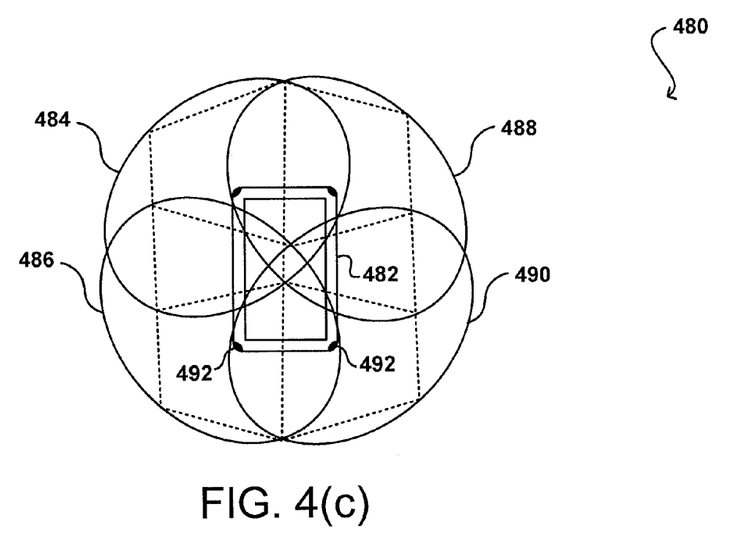
Figure 4D:
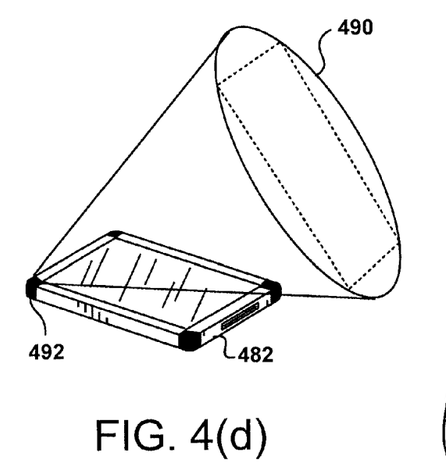
Figure 4E:
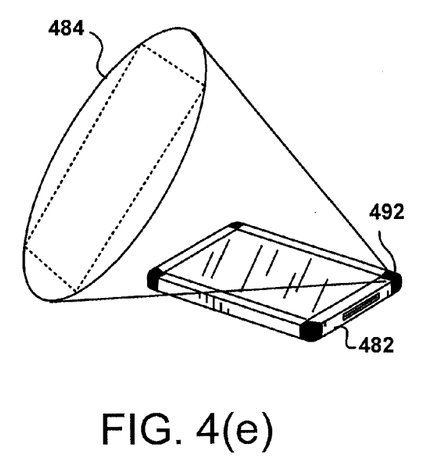

In some embodiments, the angular ranges can be oriented such that there is overlapping coverage for at least a portion of the area around the device. For example, FIGS. 4(c)-4(e) illustrate a situation 480 wherein a computing device 482 utilizes four capture elements 492 (or projection elements) with partially overlapping fields of view or angular ranges 484, 486, 488, 490, as seen in the top view of FIG. 4(c). In this example, each capture element is oriented such that the field of view is angled diagonally across the device, at an appropriate angle such as 60° from normal. As can be seen in FIG. 4(d), the camera on the upper left of the device 482 has a field of view 490 towards the lower right of the device, and in FIG. 4(e) the camera on the lower right of the device 482 has a field of view 484 towards the upper left of the device. By having each of four cameras (in this example) oriented diagonally across the device, a substantial amount of overlap over substantially a semi-spherical area of coverage can be obtained, as illustrated in FIG. 4(c). It should be understood, however, that differing numbers of elements with different orientations can be used as well within the scope of the various embodiments.

Also as mentioned, the functionality of a device can also change based upon the determined path or change in orientation, which in at least some situations can be indicative of a change in state of the device. For example, a device might determine based upon the path that the device was likely taken out of a pocket and placed on a table. In at least some embodiments, this can cause the device to activate or adjust any of a number of different functions, such as to begin capturing information about its environment, display information on a display element, adjust speaker volume, etc. In some embodiments, a display element on a device might be configured to be viewable only over a determined range of viewing angles, functioning as a dynamic privacy screen. If the device is able to determine the relative position of the user during and/or after a movement, the device can ensure that the viewing angle is adjusted to be directed primarily towards the user, even though the user and/or device might move or change orientation with respect to each other.

In one example, a device that has been removed from a pocket and placed within sight of a user might be configured to display information to the user, such as the time or information about an upcoming meeting. The device might also attempt to locate the user in order to display that information in a way that can easily be read by the user, such as rotated or skewed based on a relative direction of the user. Approaches for providing such functionality can be found in co-pending U.S. patent application Ser. No. 12/980,150, filed Dec. 28, 2010, entitled "Low Distraction Interfaces," which is hereby incorporated herein by reference. In some embodiments, the device can monitor the location of the user to attempt to determine when the user is glancing at the phone, such as by using image recognition or eye detection. Since such determination procedures can be very processor intensive, and can utilize a significant amount of power for a portable device, it can be desirable to further limit the area and/or amount of information that needs to be analyzed. A process such as those discussed elsewhere herein where the device can determine the likely direction of the user and limit the scope of processing accordingly can be beneficial in such situations.

Also, it should be understood that the relative directions of multiple people or objects can be tracked by a device concurrently. For example, a device might be in a mode where the device is to capture audio and/or video of the persons currently talking nearby. The device might do an initial 360° scan to locate people nearby, and determine the relative directions to each of those persons. In some embodiments, the device can perform image recognition on each person to attempt to recognize authorized users, such that image and/or audio capture is only performed for authorized users. Once the relative direction of each person is determined, an appropriate capture range can be determined for each of those persons using approaches discussed elsewhere herein. If the users and/or device are not moving, an appropriate tracking frequency can be determined, such as where the relative direction to each user is determined and updated on the order of every ten seconds, for example. If one of the persons moves, the angular range can be increased for that person, while the range for the non-moving person might remain unchanged. Various other approaches can be used as well within the scope of the various embodiments.

In some embodiments, other actions can be used to attempt to determine the likely direction of a user. For example, if a user is entering information into a device, such as entering a password or dialing a phone number, the device can determine the likely relative position of the user based at least in part upon the direction in which users commonly enter that information based on the orientation of the keys, display, or other such elements.

In at least some embodiments, a direction determination is performed when a device is relatively stationary, such as being placed on a table after being removed from a pocket or being plugged into a charger. In other embodiments, the buffer of positional information can be analyzed during the movement to attempt to determine the type of movement and activate functionality accordingly. For example, a user might remove a device from a pocket and hold that device in the user's hand to play a game, which might not require the device to be stationary. If touch capability is disabled when in the user's pocket, for example, determining that the device is likely being removed from the pocket, as opposed to moving as a result of the user moving while the device is still in the pocket, can cause that capability to be activated.

In some embodiments, the type of processing can also change based upon any of a number of factors. For example, a device might perform facial recognition in an attempt to locate an authorized user. Once an authorized user is located, the device might utilize a smaller range to track that user, and might not perform facial recognition as long as the user remains tracked. For example, the device might use a less processor-intensive algorithm to locate a face or feature of a user, but as long as the relative position of that person remains known to the device, the device might not perform facial recognition, or might only check periodically or upon substantial movement of the user and/or device.

In some embodiments, a device might store or have access to a pattern or library of paths or motions that can be matched against movements of the device. In at least some embodiments, a device can also learn motions over time. For example, a library might include default paths for a user removing a device from a pocket. If one user always stores a device in a front pocket, one user usually stores a device in a back pocket, and another user often stores a device in a backpack, each device can monitor these aspects and either modify existing paths or generate new paths that correspond to how that device is actually used by a respective user. If there is no matching path in a path library, the device can monitor motions and uses, before and/or after the motion, to attempt to infer the path and/or action, and generate a new path to be added to the library. In some embodiments the device can monitor how the device is used and associate certain actions with a specific motion, while in other embodiments the user can have the options of inputting or selection certain actions for a given motion. Thus, the device can effectively learn specific paths or behaviors, and in some embodiments can customize paths to reflect the specific motions of a particular user. This can be useful since, for example, different users will use different motions to place a phone up to that user's ear, take a device out of a backpack, etc.

Further, if a user often moves when the device is in one relative orientation and is often stationary when the device is in another relative orientation, the device can adjust aspects such as the default angular range and/or frequency of location determination. For example, a device might utilize a sampling rate on the order of a quarter per second instead of thirty per second for a given orientation or situation. The sampling rate can also depend upon other factors, such as current actions or events with respect to the device. For example, if the device receives a new message to be displayed to the user, the sampling rate might increase since the user is likely to move towards the device to read the message. Similarly, if the user is reading an e-book and likely will not move for an extended period of time, the sampling rate can decrease accordingly.

As mentioned, advantages of various embodiments can be used for capturing audio and/or video information, and/or analyzing that information, over a smaller range or area. Similar approaches can be used when projecting from the device, such as when projecting audio and/or video information as part of a presentation or when projecting light or infrared (IR) radiation in order to illuminate an object or region near the device. For example, a device might activate a speaker on one side of a device that is nearest a user in order to be able to potentially utilize a lower volume and reduce the number of active speakers, each potentially resulting in power savings. In some embodiments, a device with multiple projectors can project information (image or otherwise) in a direction towards the user, or in some cases in a direction opposite to the user based upon the user's direction. If the user needs to be illuminated in order to provide for adequate image capture, such as for ambient light facial recognition or IR-based gaze or gesture tracking, the direction of illumination and/or elements used for the illumination can be selected based on the user's determined position. Other processes such as thermal detection, three-dimensional image generation, and the like can take advantage of processes discussed herein as well.

Figure 5:
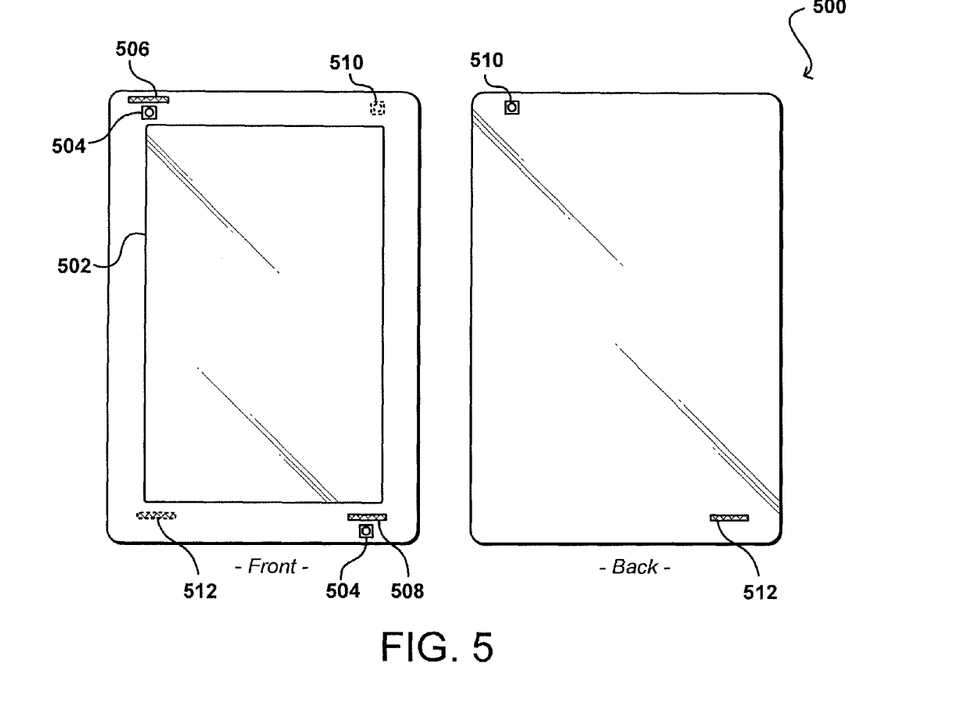
FIG. 5 illustrates front and back views of an example of a computing device including elements operable to capture audio and video information that can be used in accordance with various embodiments.

FIG. 5 illustrates front and back views of an example computing device 500 that can be used in accordance with various embodiments. Although a portable computing device (e.g., a smart phone, an electronic book reader, or tablet computer) is shown, it should be understood that any device capable of determining and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502, which under normal operation will display information to a user facing the display screen (e.g., on the same side of the computing device as the display screen). Although a computing device can include one (or no) image capture elements as discussed elsewhere herein, the computing device in this example includes two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 may be, for example, a camera, a charge-coupled device (CCD), a motion detection sensor or an infrared sensor, or other image capturing technology. The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations. As discussed, the device can utilize outputs from at least one of the image capture elements 504 and 510 to assist in determining the approximate direction, distance, and/or relative position of a user or other nearby person or object of interest. For example, if the user sets the device on a table and the user is standing to the right of the device, the captured image information can be analyzed to determine the approximate direction and/or location of the user, and can cause the device to capture image information from primarily that relative position.

Figure 6:
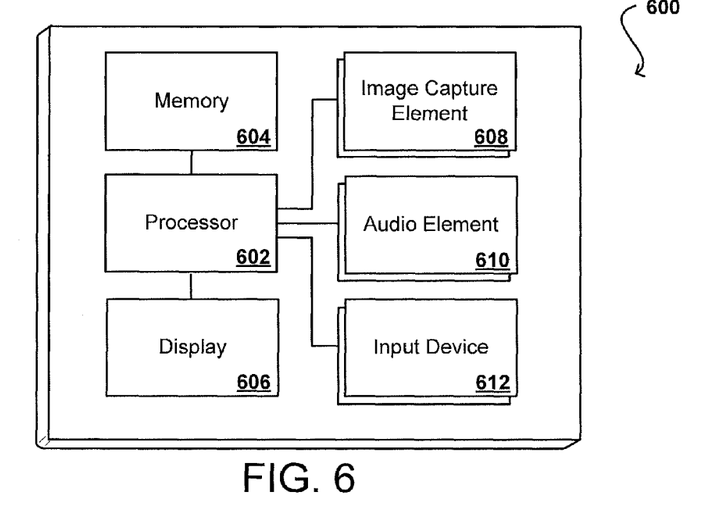
FIG. 6 illustrates example components of a computing device such as that illustrated in FIG. 5.

FIG. 6 illustrates an example set of basic components of a computing device 600, such as the device 500 described with respect to FIG. 5. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the processor 602, the same or separate storage can be used for images or data, a removable memory can be available for sharing information with other devices, and any number of communication approaches can be available for sharing with other devices. The device typically will include some type of display element 606, such as a touch screen, electronic ink (e-ink), organic light emitting diode (OLED) or liquid crystal display (LCD), although devices such as portable media players might convey information via other means, such as through audio speakers 610. As discussed, the device in many embodiments will include at least one image capture element 608, such as two cameras that are able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

Further, a device can include the ability to start and/or stop image capture, such as when receiving a command from a user or an application, or retrying to determine an audio input or other device. In some embodiments, a device can include an infrared detector or motion sensor, for example, which can be used to activate an imaging element, image analysis, etc. For example, a device might not capture and analyze image information when there is not a user in the room. If an infrared detector (i.e., a detector with one-pixel resolution that detects changes in state) detects a user entering the room, for example, the device can activate a camera in an attempt to locate the user, perform image analysis, etc.

The device can include at least one additional input device 612 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 7A:
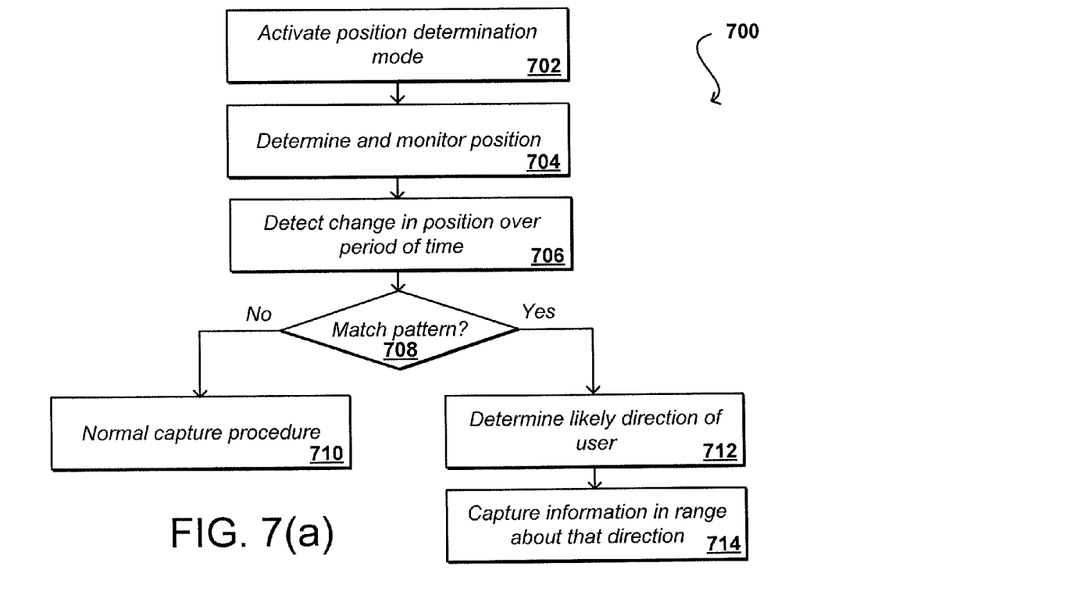
FIGS. 7(a) and 7(b) illustrate example processes for adjusting a functional aspect of an electronic device using spatial information that can be used in accordance with various embodiments.

FIG. 7(a) illustrates an example of a process 700 for capturing information for a user of an electronic device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a position determination mode is activated on the electronic device 702. The mode might be activated automatically in response to an action or event, might always be active during certain times or places, or might be manually activated by a user. The device can determine its present location and/or orientation, and monitor the location and/or orientation over time 704. As discussed, this can include storing position and/or orientation information in a buffer on the device (or remotely) for subsequent analysis. At some point, a change in position, orientation, and/or location can be determined that meets a certain criterion 706. For example, a certain amount of movement might be assumed based on a user holding a device or having that device in a pocket, such that the device might have to move by a greater amount over a certain period of time to trigger an action.

If the movement meets or exceeds such a criterion, the device can attempt to determine whether the movement matches a known pattern of movement 708. As discussed, in some embodiments the movement is only analyzed once the device is substantially stationary and/or the movement is determined to likely be complete, such as when the amount of movement falls below the above-referenced criterion. If no match is found, the device can perform a normal capture procedure 710, such as to do a full 360° scan at the end of the movement. If a pattern match is found, the device can attempt to determine the likely direction of the user based at least in part upon the pattern and the detected movement 712. As discussed, this can include, for example, analyzing the image information using an image recognition algorithm to locate a person and/or user facial recognition to identify or authenticate a user. Once such a person (or object of interest) is located, the direction to that person can be used to set a range of capture, and information (e.g., audio and/or video) can be captured and/or analyzed over that selected range 714. This can include, for example, activating one or more capture elements pointing in a given direction or processing a selected portion of the captured information corresponding to that range.

Figure 7B:
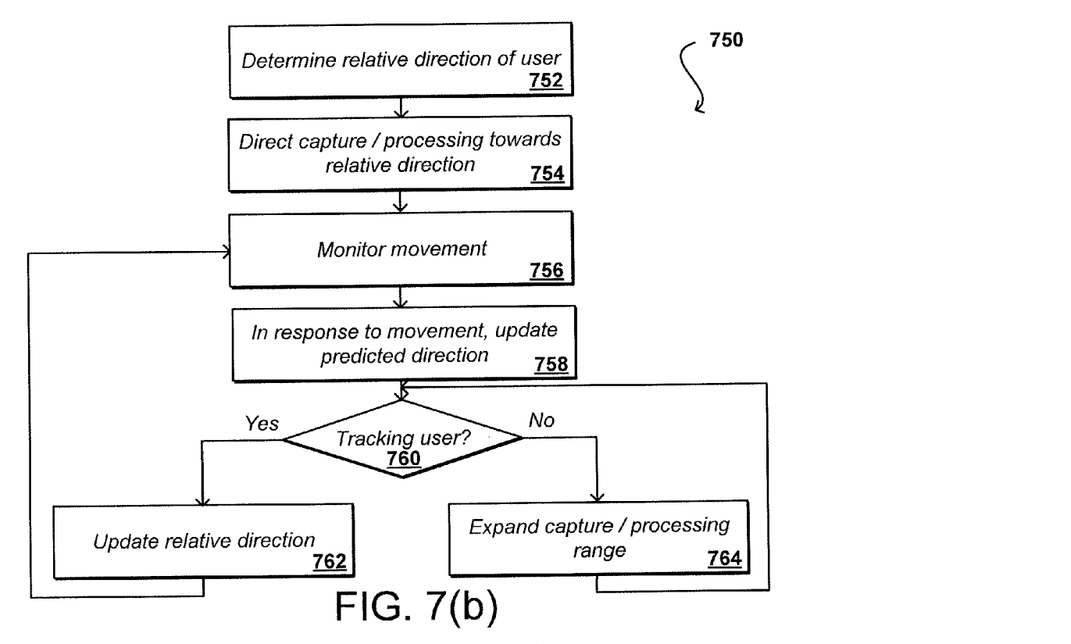

FIG. 7(b) illustrates an example process 750 for updating the determined direction to a user (or other object of interest) that can be used in accordance with various embodiments. In this example, the relative direction of a user is determined 752 and capture and/or processing is directed toward the determined relative direction 754 using a specified range as discussed, for example, with respect to FIG. 7(a). The device can monitor movement over time 756, which can include movement of the device, movement of the monitored user, or both. The movement of the user can be determined using captured information such as audio or image information, for example, while movement of the device can be determined using an orientation or motion determining element such as an accelerometer, electronic gyroscope, or inertial sensor, although image information and other data can be used as well as known in the art for determining motion. In response to a detected amount of movement that meets or exceeds at least one triggering threshold, such as an amount or rate of movement, the predicted direction to the user can be updated 758. For example, if the device is rotated 90° to the right then the device can adjust the relative position of the user by about 90° to the left (to offset the movement). If the motion follows a given path, the device can analyze the path to determine the likely relative position of the user based at least in part upon the path. If, after updating the predicted location and attempting to locate the user the device is still tracking the user 760, the device can update the relative direction of the user 762 and continue monitoring movement. If the device is not tracking the user (i.e., the user does not appear in image information captured for the predicted range of angles) then the device can expand the capture and/or processing range and attempt to locate the user 764. The range can be adjusted to a full scan, or can be iteratively increased until the user is located. Once the user is located, the relative direction can be updated 762 and monitoring can continue.

In some embodiments, a computing device can determine and track a specific feature of a user, such as an approximate area or region of interest corresponding to the user's eyes, or another such feature, such that an algorithm of the computing device only has to analyze image data substantially corresponding to that region, which can further reduce the amount of processing needed for images, particularly for high resolution, full color images. The angular range can be adjusted accordingly, although smaller angular ranges might require an increased sample rate as smaller movements can result in tracking errors.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors. Directions to users and relative angular ranges then can be specified and/or updated accordingly using various approaches discussed herein.

Figure 8:
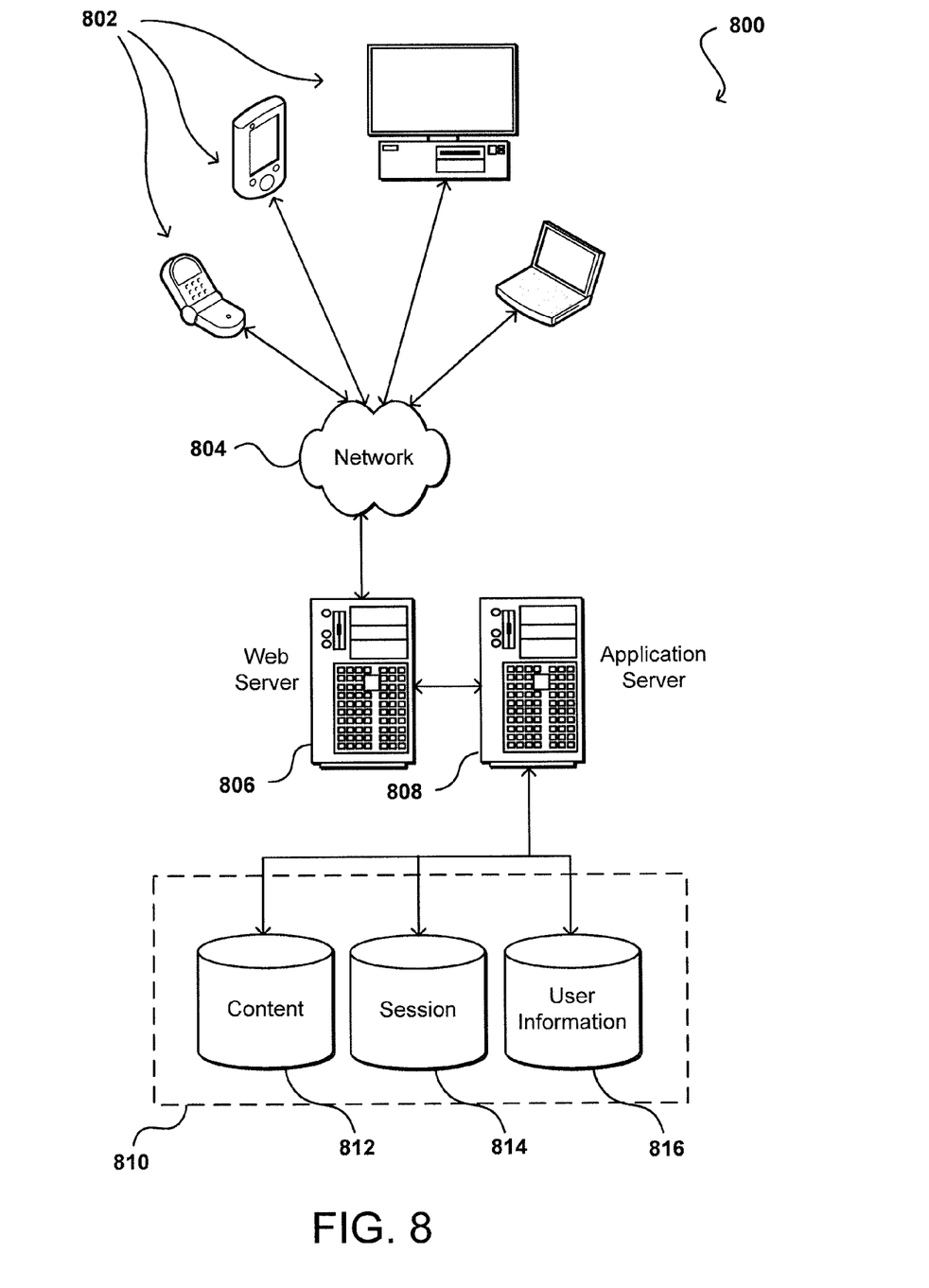
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of capturing information about a user of an electronic device, comprising:
   detecting a motion of the electronic device;
   storing information corresponding to the motion to temporary storage;

after detecting the motion, analyzing the information to determine an action corresponding to the motion;
predicting a direction of a user with respect to the electronic device based at least in part upon the motion, the predicted direction corresponding to a range of possible physical positions where the user is capable of causing the motion;
selecting at least one capture element of the electronic device having a field of view that includes an angular range surrounding the predicted direction; and
capturing, using the at least one capture element of the electronic device, information over the angular range surrounding the predicted direction of the user to determine an actual direction to the user from the electronic device, the information being captured based at least in part on the action.

2. The method of claim 1, wherein an extent of the angular range is determined at least in part by the action.

3. The method of claim 1, wherein determining an action corresponding to the motion includes comparing a path of the motion with a set of paths, each path corresponding to an associated action.

4. The method of claim 1, wherein the action includes at least one of removing the electronic device from an enclosure, setting down the electronic device, and picking up the electronic device.

5. The method of claim 1, wherein the motion is detected using at least one of an accelerometer, electronic gyroscope, electronic compass, and inertial sensor of the electronic device.

6. A method of managing information on an electronic device, comprising:
determining a first relative position of a user with respect to the electronic device;
selecting a region about the first relative position for which information is to be processed;
processing, using at least one processor, information over the region; and
in response to detecting movement between the user and the electronic device:
predicting a second relative position of the user with respect to the electronic device, based at least in part upon the movement;
selecting a new region about the second relative position, the new region corresponding to a range of physical positions where the user is capable of causing the movement;
selecting at least one capture element of the electronic device having a field of view that includes the new region; and
attempting to verify an actual relative position of the user after the movement using information captured over the new region.

7. The method of claim 6, wherein the movement corresponds to movement of the user, the movement being detected using at least one of image and audio information captured over the region.

8. The method of claim 6, wherein the movement corresponds to movement of the electronic device, the movement being determined using at least one of an accelerometer, electronic gyroscope, electronic compass, and inertial sensor of the electronic device.

9. The method of claim 6, wherein processing information over the region includes processing information captured over only the region or processing only captured information corresponding to the region.

10. The method of claim 6, wherein the region corresponds to an angular range about a determined direction between the electronic device and the first relative position of the user.

11. The method of claim 6, wherein the actual relative position is unable to be determined using information captured over the new region, and further comprising:
increasing a size of the new region; and
attempting to verify the actual relative position of the user using information captured over the size of the new region.

12. The method of claim 6, further comprising:
when the actual relative position is determined, selecting another region about the actual relative position for which information is to be processed.

13. The method of claim 6, further comprising:
analyzing motion information stored for the electronic device over a predetermined period of time to determine a path of travel; and
comparing the path of travel to a set of known path types, wherein the second relative position of the user with respect to the electronic device is predicted based at least in part upon a known path type matching the path of travel.

14. The method of claim 13, further comprising:
determining an action corresponding to the known path type; and
adjusting at least one aspect of the electronic device based at least in part upon the action.

15. The method of claim 13, further comprising:
attempting to infer an unknown path type for the path of travel based at least in part upon one or more actions taken by the user before or after similar paths of travel.

16. The method of claim 13, further comprising:
adjusting a known path type to reflect a particular path of motion for a particular user.

17. The method of claim 6, wherein selecting a new range about the second relative position includes at least one of selecting at least one capture element corresponding to the new range or specifying a range over which at least one capture element is to capture information.

18. The method of claim 17, wherein the at least one capture element is oriented to capture information from a direction at least partially diagonally across the electronic device.

19. The method of claim 6, wherein the information captured over the new region includes at least one of image information or audio information.

20. The method of claim 6, wherein processing information over the region includes projecting at least one of illuminating light, infrared radiation, image information, and audio information over at least a portion of the region.

21. A computing device, comprising:
a processor;
at least one capture element; and
a memory device including instructions operable to be executed by the processor to perform a set of actions, enabling the computing device to:
determine a relative position of a user with respect to the computing device;
select a region about the relative position for which information is to be processed;
process information over the selected region; and
in response to detecting movement between the user and the computing device:
predict a new relative position of the user with respect to the computing device, based at least in part upon the detected movement;

select a new range about the new relative position, the selected new range corresponding to a range of physical positions where the user is capable of causing the movement;

select at least one capture element of the computing device having a field of view that includes the selected new range; and attempt to verify an actual relative position of the user after the detected movement using information captured by the at least one capture element over the selected new range.

22. The computing device of claim 21, wherein the detected movement corresponds to at least one of movement of the user, being detected using at least one of image and audio information captured over the selected region, or movement of the computing device, determined using at least one of an accelerometer, electronic gyroscope, electronic compass, and inertial sensor of the computing device.

23. The computing device of claim 21, wherein the actual relative position is unable to be determined using information captured over the selected new range, and wherein the instructions when executed further cause the computing device to:

increase a size of the selected new range; and attempt to verify the actual relative position of the user using information captured over the size of the selected new range.

24. The computing device of claim 21, wherein the instructions when executed further cause the computing device to:

analyze motion information stored for the computing device over a predetermined period of time to determine a path of travel; and compare the path of travel to a set of known path types, wherein the new relative position of the user with respect to the computing device is predicted based at least in part upon a known path type matching the path of travel.

25. The computing device of claim 24, wherein the instructions when executed further cause the computing device to:

determine an action corresponding to the known path type; and adjust at least one aspect of the computing device based at least in part upon the action.

26. A non-transitory computer-readable storage medium storing processor-executable instructions for controlling a computing device, comprising:

program code for determining a relative position of a user with respect to the computing device;

program code for selecting a region about the relative position for which information is to be processed;

program code for processing information over the region; and program code for, in response to detecting movement between the user and the computing device:

predicting a new relative position of the user with respect to the computing device, based at least in part upon the detected movement;

selecting a new range about the new relative position, the selected new range corresponding to a range of physical positions where the user is capable of causing the detected movement;

selecting at least one capture element of the computing device having a field of view that includes the selected new range; and attempting to verify an actual relative position of the user after the detected movement using information captured by the at least one capture element over the selected new range.

27. The non-transitory computer-readable storage medium of claim 26, further comprising:

program code for analyzing motion information stored for the computing device over a predetermined period of time to determine a path of travel; and program code for comparing the path of travel to a set of known path types, wherein the new relative position of the user with respect to the computing device is predicted based at least in part upon a known path type matching the path of travel.

28. The non-transitory computer-readable storage medium of claim 27, further comprising:

program code for determining an action corresponding to the known path type matching the path of travel; and program code for adjusting at least one aspect of the computing device based at least in part upon the determined action.

* * * * *